G. W. COTTINGHAM & J. H. BINKLEY.
Improvement in Churns.
No. 131,939. Patented Oct. 8, 1872.
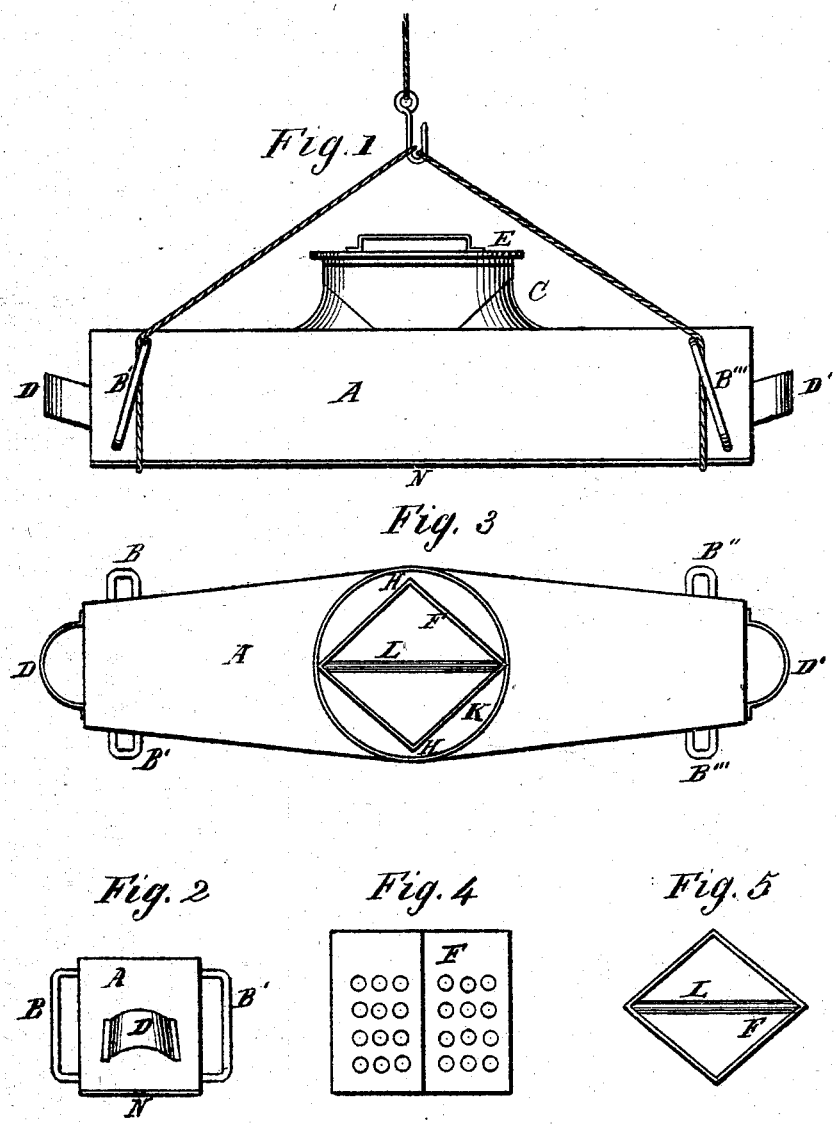

UNITED STATES PATENT OFFICE.

GIDEON W. COTTINGHAM AND JASPER H. BINKLEY, OF COLUMBUS, TEXAS.

IMPROVEMENT IN CHURNS.

Specification forming part of Letters Patent No. 131,939, dated October 8, 1872.

*To all whom it may concern:*

Be it known that we, GIDEON W. COTTINGHAM and JASPER H. BINKLEY, of Columbus, in the county of Colorado and State of Texas, have invented certain new and useful Improvements in Churns, by which means an efficient, convenient, and durable device is furnished, being at the same time simple in construction and not liable to get out of repair; and it consists in providing an oblong box or churn of tin, zinc, or other suitable material and furnishing the same with a perforated or bar dash of diamond shape, said dash remaining fixed in the box and the churning done by swinging the box, the same being conveniently suspended for that purpose; and in the construction and combination of parts, as more fully hereinafter described and pointed out by the claim; and we do hereby declare that the following is a full, clear, and exact description of the same, which will enable others skilled in the art to which it appertains to make and use the same, reference being had to the accompanying drawing, with letters of reference marked thereon, forming a part of this specification, in which—

Figure 1 represents a side elevation of a device embodying my invention; Fig. 2 is a top or plan view; Fig. 3 is an end view; Fig. 4 is a side view of the dash showing the perforations; and Fig. 5 is a top view of the same.

A represents the box or churn of the form shown, being provided on the sides near each end with the handles B B' B'' B''' used in swinging the churn, the same being conveniently suspended by a cord—as represented—placed upon a hook over the churn. The churn may be easily carried from one place to another by the handles D D', which are securely attached to the ends of the box A. C represents a neck projecting from and above the center of the box A, and may be kept closed when the churn is in use by the cover E. F represents the dash, which is of diamond form and the sides of which are perforated; but it may be formed of bars, if preferred. This dash F sits down in the opening K of the neck C. The dash is rendered sufficiently strong, being braced by the cross-bar L. A spout may be formed in the opening H, if desired.

The operation of the device is as follows: The box or churn is first filled or partially filled with cream and suspended, as before described, and a rapid swinging motion imparted to the box or churn, which drives the cream through the dash back and forth until butter is obtained.

Having thus fully described our invention, what we claim, and desire to secure by Letters Patent, is—

1. The box or churn A, constructed as described, and provided with the neck C and diamond-shaped dash F, the several parts being combined and arranged substantially as and for the purpose herein set forth.

2. In combination with the elements named in the foregoing claim, the handles D D' and B B' B'' B''' and suspending-cord, substantially as and for the purpose set forth.

G. W. COTTINGHAM.
J. H. BINKLEY.

Witnesses:
JNO. T. HARCOURT,
J. JAY HARCOURT.